(12) United States Patent
McGee et al.

(10) Patent No.: US 8,744,698 B2
(45) Date of Patent: Jun. 3, 2014

(54) ENGINE RESTART STRATEGY

(75) Inventors: Ryan Abraham McGee, Ann Arbor, MI (US); Ihab S. Soliman, Irvine, CA (US); Xiaoyong Wang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 567 days.

(21) Appl. No.: 13/016,102

(22) Filed: Jan. 28, 2011

(65) Prior Publication Data

US 2012/0197503 A1 Aug. 2, 2012

(51) Int. Cl.
*G06F 17/00* (2006.01)
*B60W 10/00* (2006.01)

(52) U.S. Cl.
USPC .............................................. 701/51; 477/77

(58) Field of Classification Search
CPC . B60W 10/06; B60W 2540/12; B60W 10/04; B60W 10/11; B60W 10/115; B60W 2030/206; B60W 2050/0075; B60W 2510/0676; B60W 2510/244; B60W 2540/10; B60W 2540/16; B60W 30/18; B60W 30/18054; B60W 30/192; B60W 50/06; F02N 11/00
USPC ............................. 701/51–56, 67, 78, 85, 87; 180/374–377, 336; 477/77, 70, 5, 84
See application file for complete search history.

(56) References Cited

U.S. PATENT DOCUMENTS

| | | | |
|---|---|---|---|
| 6,434,475 B2 | 8/2002 | Kaneko et al. | |
| 6,466,860 B2 | 10/2002 | Kaneko | |
| 6,845,305 B1 | 1/2005 | Raftari et al. | |
| 6,881,170 B2 * | 4/2005 | Onoyama et al. | 477/39 |
| 7,150,254 B2 | 12/2006 | Ichimoto et al. | |
| 7,610,143 B1 * | 10/2009 | Boesch | 701/112 |
| 2009/0013952 A1 | 1/2009 | Deniston et al. | |

OTHER PUBLICATIONS

Hybrid Electric Vehicle (HEV) Concepts—Fuel Savings and Costs Holger Jené et al., 9 Pages, 2009.
Multidisciplinary Technology Hybrid Technology, 14 pages, 2009.
Vehicle Technology—Enabling a Better Automotive World, Valeo, 49 Pages, 2009.

* cited by examiner

*Primary Examiner* — Muhammad Shafi
(74) *Attorney, Agent, or Firm* — Brooks Kushman P.C.; David B. Kelley

(57) ABSTRACT

A vehicle includes an internal combustion engine, a transmission having a neutral state and an engaged state, and a controller. The controller is configured to determine a restart condition for the engine; and to classify the restart condition as one of: (i) a no wheel torque restart condition, and (ii) a wheel torque restart condition. The state of the transmission is set based on the restart condition classification, and the engine is started.

13 Claims, 2 Drawing Sheets

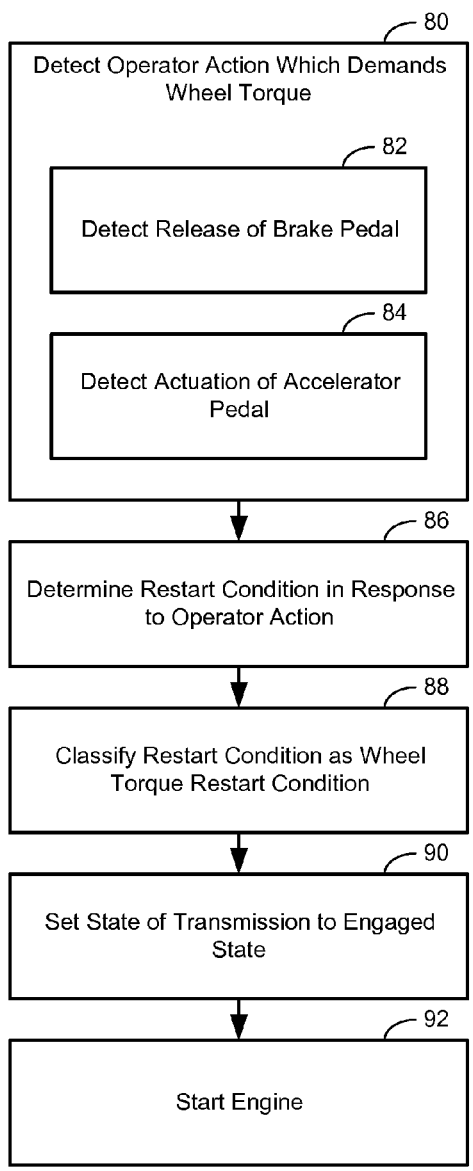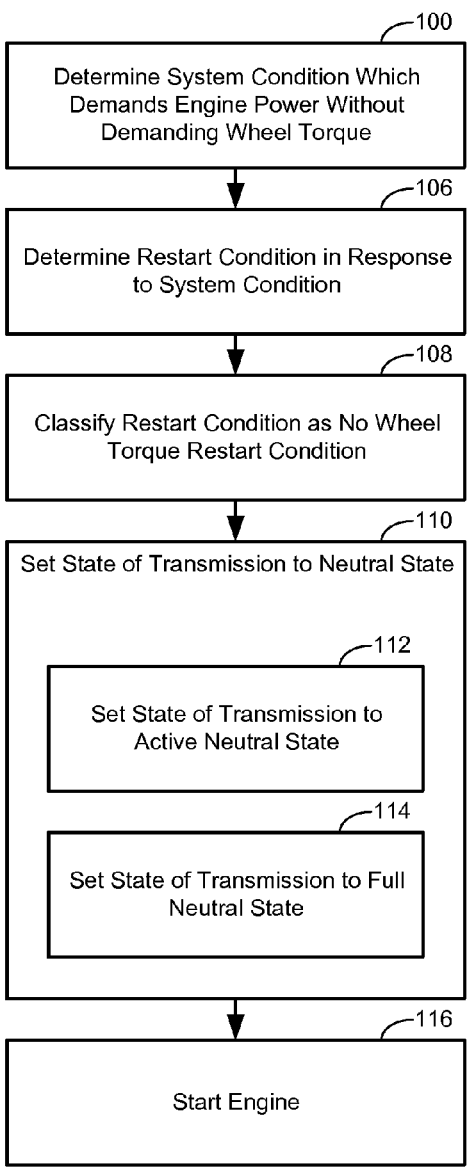

ENGINE RESTART STRATEGY

BACKGROUND

1. Technical Field

The invention relates to an engine restart strategy.

2. Background Art

An engine start/stop system for a vehicle stops the internal combustion engine when the vehicle is stopped, and then starts the internal combustion engine when the driver requests acceleration. The engine also may be started, for example, due to loads on the electrical system or due to the catalyst temperature being low. For example, the internal combustion engine may be stopped when the vehicle stops at traffic lights or stops in a traffic jam. This approach is known as static start/stop. The stopping of the engine when the engine is not needed improves fuel economy, and reduces emissions. Although, sometimes, the engine may stay on when the vehicle is stopped because the alternator needs to run due to loads on the electrical system, or the engine may stay on for other reasons such as, for example, when the catalyst temperature is too low. In some approaches, fuel economy may be improved by 3-4% with static start/stop.

It is important that an engine start/stop system functions seamless and transparent to the driver, with minimal noise, vibration, and harshness. It is also important that when the driver requests torque at the wheels through the accelerator pedal, the time delay for starting the engine must be minimized.

In one example, the vehicle includes an internal combustion engine and a traditional automatic transmission. The engine torque is transferred to the wheels though a torque converter and then through the gearbox. The engine is started via a starter motor. The control system determines when to start and stop the engine based upon the driver's actions, the state of the vehicle and environmental conditions. The engine is started with the gearbox in the in gear state.

For the foregoing reasons, there is a continuing need for balancing the needs for a seamless engine start (minimal noise, vibration, and harshness) and for a fast engine start.

SUMMARY

It is an object of the invention to provide an improved approach to engine restart strategy.

It is a further object of the invention to provide a dual mode engine restart strategy.

In one embodiment, a method of controlling a vehicle is provided. The vehicle includes an internal combustion engine, and a transmission having a neutral state and an engaged state.

The method comprises determining a restart condition for the engine; and classifying the restart condition as one of: (i) a no wheel torque restart condition, and (ii) a wheel torque restart condition. The state of the transmission is set based on the restart condition classification, and the engine is started.

At the more detailed level, the invention comprehends various additional features that may be included individually or in various combinations in various embodiments of the invention. For example, the method may further include determining a shutdown condition for the engine; and stopping the engine in response to the shutdown condition.

In one aspect, the method further comprises detecting an operator action which demands wheel torque. The restart condition is determined in response to the operator action. The restart condition is classified as the wheel torque restart condition. In turn, setting the state of the transmission further comprises setting the state of the transmission as the engaged state in response to the wheel torque restart condition. Further, in this aspect, detecting the operator action may further comprise detecting the release of the brake pedal or detecting the actuation of the accelerator pedal.

In another aspect, the method further comprises determining a system condition which demands engine power without demanding wheel torque. The restart condition is determined in response to the system condition. The restart condition is classified as the no wheel torque restart condition. In turn, setting the state of the transmission further comprises setting the state of the transmission as the neutral state in response to the no wheel torque restart condition.

The transmission may have an active neutral state and a full neutral state. In this case, setting the state of the transmission may further comprise setting the state of the transmission as the active neutral state, or as the full neutral state, depending on the situation.

In another embodiment of the invention, a vehicle is provided. The vehicle comprises an internal combustion engine, a transmission having a neutral state and an engaged state, and a controller. The controller is configured to: determine a restart condition for the engine as one of: (i) a no wheel torque restart condition, and (ii) a wheel torque restart condition. The state of the transmission is set based on the restart condition classification, and the engine is started.

In another embodiment of the invention, a method of starting a vehicle engine comprises classifying a start condition as one of: (i) a no wheel torque restart condition, and (ii) a wheel torque restart condition; setting a transmission state based on the restart condition; and starting the engine.

BRIEF DESCRIPTION OF THE DRAWINGS

FIG. 3 is a block diagram illustrating further aspects of the invention; and

FIG. 4 is a block diagram illustrating further aspects of the invention.

DETAILED DESCRIPTION

Figure 1:
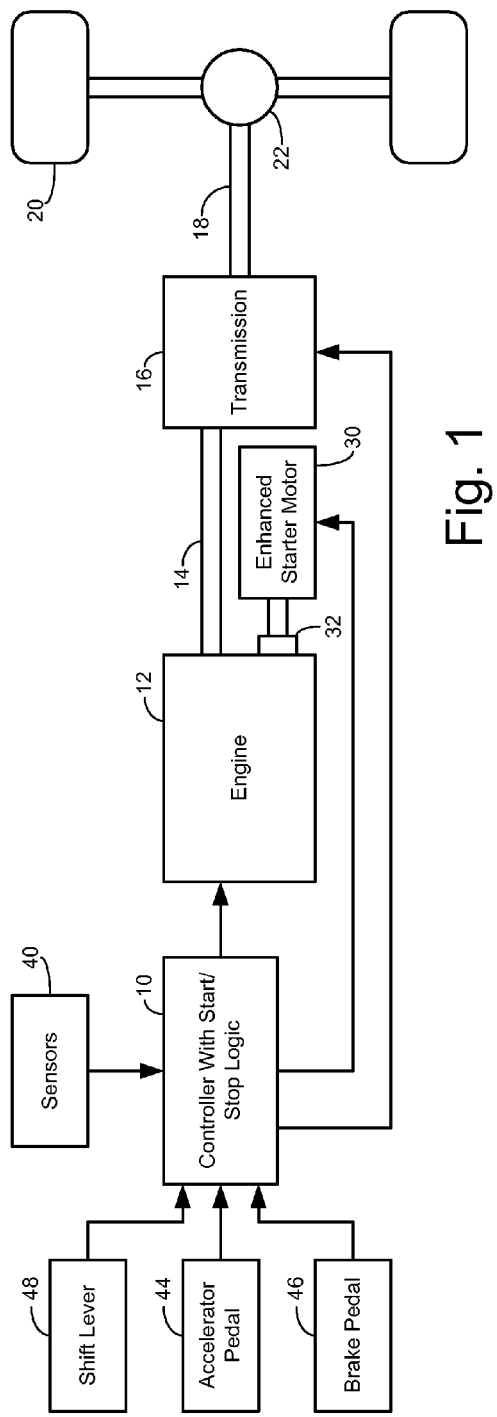
FIG. 1 is a schematic representation of a powertrain system configuration.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention comprehends various aspects of an engine restart strategy, particularly useful for an engine start/stop system. Embodiments of the invention are not limited to any particular powertrain configurations. Examples are described in further detail below.

Balancing the needs for a seamless engine start (minimal noise, vibration, and harshness) and for a fast engine start, in accordance with the invention, involves classifying restart conditions as one of: (i) a no wheel torque restart condition, and (ii) a wheel torque restart condition. In more detail, there are several choices the control system can make which will affect the balance between engine restart time and NVH. In the following example, the gearbox can be in one of three states: (1) in gear; (2) active neutral; and (3) full neutral.

In the active neutral state, appropriate clutches are at touching point such that there is zero or near zero torque transfer by the clutches.

In the full neutral state, the clutches are completely disengaged. This is how the gearbox operates when the shifter is in the neutral position.

Restarting the engine with the transmission in gear will result in the fastest time to wheel torque delivery. As the engine is started, any torque through the transmission will result in torque at the wheels.

Restarting in active neutral state will result in zero torque to the wheels, but there will be a minimal delay to wheel torque delivery since only a small amount of additional clutch movement is required to transfer all the torque to the wheels. A challenge with active neutral is correctly determining the touching point. There may be inaccuracies in this determination.

Finally, restarting in full neutral will guarantee that no torque is transferred to the wheels during the engine restart. This will minimize the NVH during the restart, but it will require a longer time to transfer torque to the wheels since the clutches need to be engaged.

A problem addressed in embodiments of the invention is how to choose the transmission state so as to achieve an optimum balance of NVH and minimum time to develop torque at the wheels.

In accordance with the invention, the solution is to differentiate between two types of restarts: (i) a no wheel torque restart condition, and (ii) a wheel torque restart condition.

Continuing with the example, a no wheel torque restart (system induced restart) happens when something in the vehicle needs the engine started. For example, the engine needs to be restarted for a low battery state of charge. In this case, the tradeoff should be shifted towards minimizing NVH since the driver does not need a fast restart.

In a wheel torque restart (driver induced start), the driver interacts with the vehicle (typically through the brake pedal, accelerator pedal and shifter) and the control system determines that torque is requested at the wheels. Typically this occurs when the driver lifts their foot off the brake pedal and request for creep torque is generated. In this case, the tradeoff should be shifted towards fast restart and fast torque delivery.

In embodiments of the invention, the vehicle differentiates between these two types of engine restarts and modifies the state of the transmission to optimize NVH versus time to wheel torque delivery.

For no wheel torque restarts, the engine will be restarted with the transmission either in the active neutral state or in the full neutral state. The choice of active versus full neutral depends on the transmission hardware set up and the control system design. For example, some transmissions will be equipped with a transmission auxiliary pump which will maintain transmission line pressure while the engine is off. For a vehicle with a conventional transmission without an auxiliary pump, it will be possible to change the transmission state from full neutral to active neutral once line pressure is developed from the mechanically driven pump.

For wheel torque restarts, the engine will be started with the transmission in gear. This will minimize the delay from the engine start request to the torque delivery at the wheels. Precise control of air, spark and fuel will be required to ensure the torque is delivered smoothly through the transmission. If equipped, the torque converter will provide some isolation between the engine and the wheels.

Embodiments of the invention may be implemented in a variety of applications. One example powertrain configuration is described below.

An example powertrain configuration is shown in FIG. 1. A vehicle controller 10 includes appropriate logic/controls for implementing an engine start/stop system. An internal combustion engine 12, controlled by controller 10, distributes torque through torque input shaft 14 to transmission 16. The transmission 16 includes a torque output shaft 18 drivably connected to vehicle traction wheels 20 through a differential and axle mechanism 22.

An enhanced starter motor 30 is provided to implement the engine start/stop system. In general, controller 10 receives input from various vehicle sensors 40, accelerator pedal 44, brake pedal 46, and shift lever 48. Controller 10 implements an engine start/stop system by, at appropriate times, stopping engine 12 by halting fueling and starting engine 12 with enhanced starter motor 30 which engages engine 12 through a suitable mechanism 32. The controller 10 may generally implement start/stop, with one or more of the additional features provided by embodiments of the invention as described in further detail below. Other aspects of the powertrain system of FIG. 1 may be implemented in a known fashion as is appreciated by those skilled in the art. Further, embodiments of the invention are not limited to the particular illustrated powertrain configuration. In addition, embodiments of the invention are not limited to any particular transmission configuration. Although some discussion of an automatic transmission including a torque converter and gearbox is provided herein, other arrangements are possible. For example, a dual clutch transmission is one such possibility.

Figure 2:
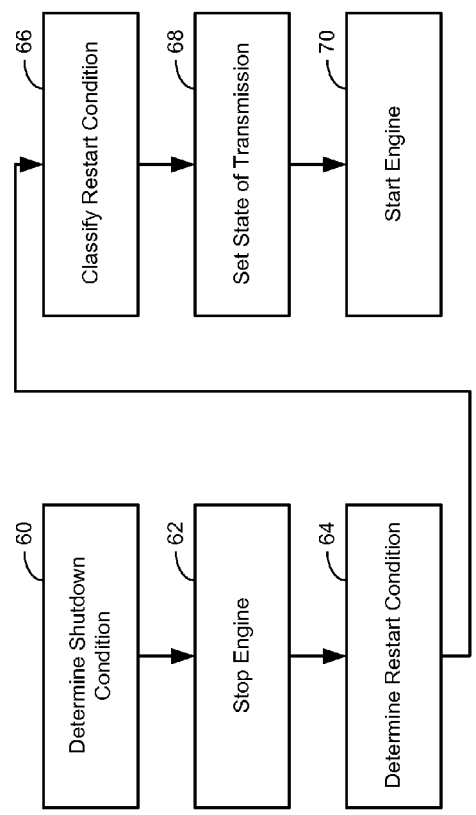
FIG. 2 is a block diagram illustrating a method of the invention for engine restart strategy.

FIG. 2 is a block diagram illustrating a method of the invention for engine restart strategy, in one embodiment. At block 60, a shutdown condition for the engine is determined. For example, the start/stop logic may determine a shutdown condition when the vehicle is stopped at a stop light. At block 62, the engine is stopped in response to the shutdown condition.

At block 64, a restart condition for the engine is determined. For example, the start/stop logic may determine a restart condition in response to a driver request for acceleration. System induced restart conditions are also possible. For example, the restart condition may also be determined due to loads on the electrical system or due to the catalyst temperature being low. At block 66, in accordance with the invention, the restart condition is classified as one of: (i) a no wheel torque restart condition, and (ii) a wheel torque restart condition.

At block 68, the state of the transmission is set based on the restart condition classification. Finally, at block 70, the engine is started.

FIG. 3 is a block diagram illustrating further aspects of the invention, in one embodiment. At block 80, when the engine is stopped, an operator action which demands wheel torque is detected. For example, as indicated at block 82, release of the brake pedal (request for creep torque) may be detected. In another example, at block 84, actuation of the accelerator pedal may be detected.

At block 86, the restart condition is determined in response to the operator action. At block 88, in this case, the restart condition is classified as the wheel torque restart condition, that is, driver induced restart. In turn, at block 90, the transmission is set to the engaged state in response to the wheel torque restart condition. Finally, at block 92, the engine is started.

FIG. 4 is a block diagram illustrating further aspects of the invention, in one embodiment. At block 100, when the engine is stopped, a system condition which demands engine power without demanding wheel torque is detected.

At block 106, the restart condition is determined in response to the system condition. At block 108, in this case, the restart condition is classified as a no wheel torque restart condition, that is, a system induced restart. In turn, at block 110, the transmission is set to the neutral state in response to the no wheel torque restart condition.

It is appreciated that, in some transmission configurations, there may be an active neutral state in addition to the full (normal) neutral state. Accordingly, setting the state of the transmission to the neutral state (block 110) may, as appropriate, set the state of the transmission to the active neutral state (block 112) or to the full neutral state (block 114). At block 116, the engine is started.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. A vehicle comprising:
   an engine;
   a transmission having a neutral state and an engaged state; and
   a controller configured to:
      set the state of the transmission as the neutral state or the engaged state in response to a restart condition classification, the restart condition classification being one of: (i) a no wheel torque restart condition, and (ii) a wheel torque restart condition; and start the engine.

2. The vehicle of claim 1 wherein the controller is further configured to:
   automatically stop the engine in response to a shutdown condition.

3. The vehicle of claim 1 wherein the controller is further configured to:
   set the state of the transmission as the neutral state or the engaged state in response to a restart condition classification corresponding to the wheel torque restart condition, the wheel torque restart condition being an operator action which demands wheel torque.

4. The vehicle of claim 3 wherein setting the state of the transmission as the neutral state or the engaged state further comprises:
   setting the state of the transmission as the engaged state in response to the restart condition classification corresponding to the wheel torque restart condition.

5. The vehicle of claim 4 wherein the controller is configured to set the state of the transmission as the engaged state in response to a restart condition classification corresponding to the wheel torque restart condition, the wheel torque restart condition being release of the brake pedal.

6. The vehicle of claim 4 wherein the controller is configured to set the state of the transmission as the engaged state in response to a restart condition classification corresponding to the wheel torque restart condition, the wheel torque restart condition being actuation of the accelerator pedal.

7. The vehicle of claim 1 wherein the controller is further configured to:
   set the state of the transmission as the neutral state or the engaged state in response to a restart condition classification corresponding to the no wheel torque restart condition, the wheel torque restart condition being a system condition which demands engine power without demanding wheel torque.

8. The vehicle of claim 7 wherein setting the state of the transmission as the neutral state or the engaged state further comprises:
   setting the state of the transmission as the neutral state in response to a restart condition classification corresponding to the no wheel torque restart condition.

9. A vehicle comprising:
   an engine;
   a transmission having a neutral state and an engaged state; and
   a controller configured to:
      set the state of the transmission as the neutral state in response to a restart condition corresponding with a system condition which demands engine power without demanding wheel torque;
      set the state of the transmission as the engaged state in response to a restart condition corresponding with a driver torque request; and
      start the engine.

10. The vehicle of claim 9, wherein the controller is further configured to set the state of the transmission as the engaged state in response to a restart condition corresponding with a driver torque request, the driver torque request being a driver actuation of the accelerator pedal.

11. The vehicle of claim 9, wherein the controller is further configured to set the state of the transmission as the engaged state in response to a restart condition corresponding with a driver torque request, the driver torque request being a driver release of the brake pedal.

12. The vehicle of claim 9, wherein the controller is further configured to automatically stop the engine in response to a shutdown condition.

13. A vehicle comprising:
   an engine;
   a transmission drivably connected to the engine and having a disengaged neutral state and an engaged state; and
   a controller in communication with the engine and the transmission, the controller configured to set the state of the transmission as the neutral state in response to a restart condition corresponding with a system condition which demands engine power without demanding wheel torque, set the state of the transmission as the engaged state in response to a release of a brake pedal or an actuation of an accelerator pedal, and to start the engine.

* * * * *